United States Patent
Skala et al.

(10) Patent No.: US 8,415,067 B2
(45) Date of Patent: Apr. 9, 2013

(54) THREE-WAY DIVERTER ASSEMBLY FOR A FUEL CELL SYSTEM

(75) Inventors: Glenn W. Skala, Churchville, NY (US); Benno Andreas-Schott, Pittsford, NY (US); Martin M. Hoch, Webster, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 987 days.

(21) Appl. No.: 12/031,160

(22) Filed: Feb. 14, 2008

(65) Prior Publication Data
US 2009/0208795 A1     Aug. 20, 2009

(51) Int. Cl.
*H01M 2/38* (2006.01)
(52) U.S. Cl. ......... 429/456; 429/400; 429/428; 429/433
(58) Field of Classification Search .................. 429/456, 429/433, 400, 428
See application file for complete search history.

(56) References Cited

U.S. PATENT DOCUMENTS

| | | | |
|---|---|---|---|
| 5,531,248 A | 7/1996 | Pearson et al. | |
| 6,383,672 B1 * | 5/2002 | Fujita | 429/434 |
| 2007/0166577 A1 * | 7/2007 | Inai et al. | 429/13 |
| 2007/0287041 A1 | 12/2007 | Alp et al. | |

FOREIGN PATENT DOCUMENTS

| | | |
|---|---|---|
| CN | 200949682 Y | 9/2007 |
| DE | 2943091 C2 | 5/1981 |
| DE | 3501827 A1 | 9/1985 |
| DE | 19931062 B4 | 1/2001 |
| DE | 10219626 A1 | 11/2002 |
| DE | 10328246 B4 | 1/2005 |
| DE | 10325196 B3 | 2/2005 |
| JP | 63187046 A1 | 8/1988 |

* cited by examiner

*Primary Examiner* — Jane Rhee
(74) *Attorney, Agent, or Firm* — Fraser Clemens Martin & Miller LLC; J. Douglas Miller

(57) ABSTRACT

A three-way diverter assembly with a contoured valve is provided. The three-way diverter assembly includes a housing having a first inlet, a second inlet, a first outlet, and a second outlet. The first inlet and the second inlet are adapted to receive a fluid. The contoured valve is disposed in the housing adjacent the first inlet. The contoured valve is rotatable about an axis from a first positional limit to a second positional limit, and to a plurality of positions therebetween. Fuel cell systems having the three-way diverter assembly for regulating temperature and humidity of a fuel cell stack are also provided.

18 Claims, 3 Drawing Sheets

THREE-WAY DIVERTER ASSEMBLY FOR A FUEL CELL SYSTEM

FIELD OF THE INVENTION

The present disclosure relates to a three-way diverter assembly and, more particularly, to a fuel cell system including the three-way diverter assembly.

BACKGROUND OF THE INVENTION

A fuel cell has been proposed as a clean, efficient and environmentally responsible energy source for various applications. Individual fuel cells can be stacked together in series to form a fuel cell stack. The fuel cell stack is capable of supplying a quantity of electricity sufficient to provide power to an electric vehicle. In particular, the fuel cell stack has been identified as a desirable alternative for the traditional internal-combustion engine used in modern vehicles.

One type of fuel cell stack is known as a proton exchange membrane (PEM) fuel cell stack. The typical PEM fuel cell includes three basic components: a cathode, an anode, and an electrolyte membrane. The cathode and anode typically include a finely divided catalyst, such as platinum, supported on carbon particles and mixed with an ionomer. The electrolyte membrane is sandwiched between the cathode and the anode. Porous diffusion media which facilitate a delivery and distribution of reactants, such as hydrogen gas and air, may be disposed adjacent the anode and the cathode.

In a vehicle power system employing the PEM fuel cell stack, the hydrogen gas is supplied to the anodes from a hydrogen storage source, such as a pressurized hydrogen tank. The air is supplied to the cathodes by an air compressor unit. The hydrogen gas reacts electrochemically in the presence of the anode to produce electrons and protons. The electrons are conducted from the anode to the cathode through an electrical circuit disposed therebetween. The protons pass through the electrolyte membrane to the cathode where oxygen from the air reacts electrochemically to produce oxygen anions. The oxygen anions react with the protons to form water as a reaction product.

The electrochemical fuel cell reaction also has a known temperature range within which the reaction may efficiently occur. The electrochemical fuel cell reaction is exothermic and generally allows the fuel cell stack to maintain a temperature within the desired temperature range during an operation thereof. Supplemental heating is typically employed during a start-up operation of the fuel cell stack to raise the temperature of the fuel cell stack within the desired temperature range. For example, the fuel cell stack may be in fluid communication with a coolant system that circulates a coolant through the fuel cell stack. The coolant may be heated, such as with electrical heaters, to raise the temperature of the fuel cell stack. The coolant may also transfer excess heat away from the fuel cell stack by circulating through a radiator that exhausts the heat to the ambient atmosphere.

It is known to regulate the temperature of the fuel cell stack by diverting coolant around the radiator when a heating of the fuel cell stack is desired, and by directing coolant to the radiator when a cooling of the fuel cell stack is desired. Diverter assemblies or valves that selectively modify the coolant flow are employed as thermostats within the fuel cell system. Known diverter valves include rotating disc-type valves, three-way ball valves, three-way plug valves, and three-way butterfly valves. The rotating disc-type valves, three-way ball valves, and three-way plug valves have sliding seals that permit leaking between the valve seated positions, and may also require an undesirable amount of torque to actuate.

Three-way butterfly valves have a substantially flat plate positioned inside the valve body. The flat plate is coupled to a rod that turns the plate to positional limits parallel or perpendicular the coolant flow. The flat plate is restrictive to the coolant flow when rotated to either end of the valve positional limits. Three-way butterfly valves are also able to be actuated with a more desirable amount of torque than with the other known valves. However, since the flat plate is always present within the flow, regardless of position, an undesirable pressure drop across the valve is often induced. Three-way butterfly valves are also known to exhibit undesirable flow control between the valve positional limits. The flow control between the valve positional limits in conventional three-way butterfly valves is known to be substantially and undesirably nonlinear.

There is a continuing need for a diverter assembly that exhibits greater flow controllability, improved pressure drop characteristics, and a desirable torque actuation requirement than valves known in the art. Desirably, the diverter assembly may be employed as a thermostat in a fuel cell system.

SUMMARY OF THE INVENTION

In concordance with the instant disclosure, a diverter assembly that exhibits greater flow controllability, improved pressure drop characteristics, a desirable torque actuation requirement, and that may be employed as a thermostat in a fuel cell system, is surprisingly discovered.

In one embodiment, a diverter assembly according to the disclosure is a three-way diverter assembly having a housing having a first inlet, a first outlet, and a second outlet. The first inlet is adapted to receive a fluid. The diverter assembly includes a contoured valve disposed in the housing adjacent the first inlet. The contoured valve is selectively rotatable about an axis from a first positional limit to a second positional limit, and to a plurality of positions therebetween.

In another embodiment, a fuel cell system includes a fuel cell stack having a plurality of fuel cells, a coolant fluid inlet, and a coolant fluid outlet. The fuel cell system further includes a pump in fluid communication with the fuel cell stack and adapted to provide a coolant fluid thereto, and a radiator having a radiator inlet and a radiator outlet. The radiator is in fluid communication with the fuel cell stack and the pump. The three-way diverter assembly is disposed between the radiator and the fuel cell stack and adapted to regulate the temperature of the fuel cell stack. The first inlet is in fluid communication with the coolant fluid outlet. A second inlet is in fluid communication with the radiator outlet. The first outlet is in fluid communication with the coolant fluid inlet. The second outlet is in fluid communication with the radiator inlet. The three-way diverter assembly selectively causes one of a) the coolant fluid to bypass the radiator and flow to the fuel cell stack, b) the coolant fluid to flow to the radiator, and c) a combination of a) and b), to thermostatically regulate the fuel cell stack.

In a further embodiment, a second fuel cell system includes a fuel cell stack having a plurality of fuel cells, a cathode inlet, and a cathode outlet. The second fuel cell system includes an air compressor in fluid communication with the fuel cell stack and adapted to provide a flow of charged air thereto. A water vapor transfer device is in fluid communication with the air compressor and the fuel cell stack and adapted to selectively humidify the charged air. The three-way diverter assembly is in fluid communication with the air compressor and each of the fuel cell stack and the water vapor transfer device. The three-way diverter assembly is adapted to regulate a relative humidity of the fuel cell stack. The first inlet is in fluid communication with the air compressor. The first outlet is in fluid communication with the water vapor transfer device. The second outlet is in fluid communication with the cathode inlet of the fuel cell stack. The three-way diverter assembly selectively causes one of a) the charged air to bypass the water vapor transfer device and flow to the fuel cell stack, b) the charged air to flow to the water vapor transfer device, and c) a combination of a) and b), to regulate a humidity of the fuel cell stack.

DRAWINGS

The above, as well as other advantages of the present disclosure, will become readily apparent to those skilled in the art from the following detailed description, particularly when considered in the light of the drawings described hereafter.

Figure 1:
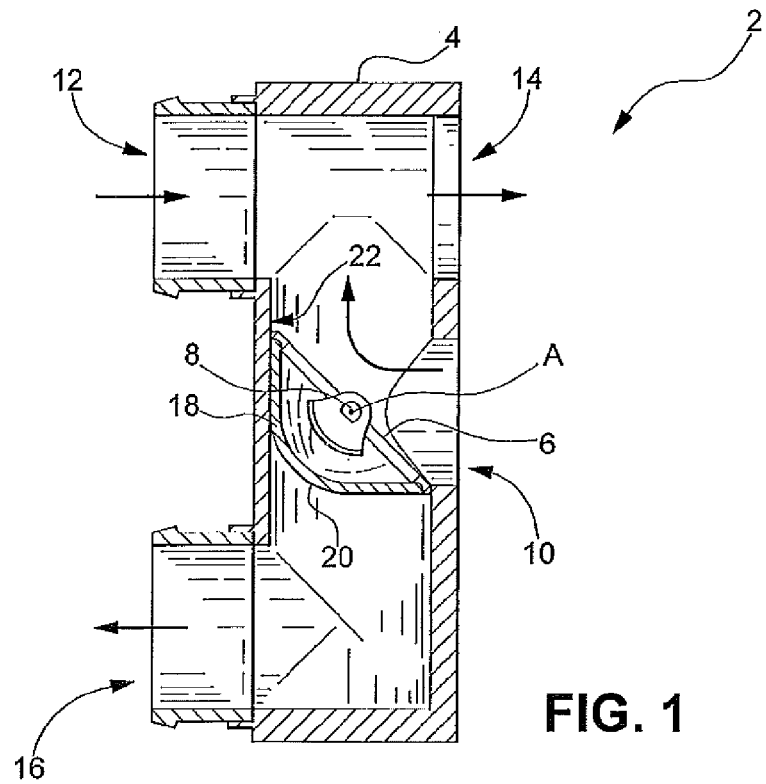
FIG. 1 shows a side cross-sectional view of a three-way diverter assembly according to an embodiment of the present disclosure, the three-way diverter assembly shown in a first mode of operation.
Figure 2:
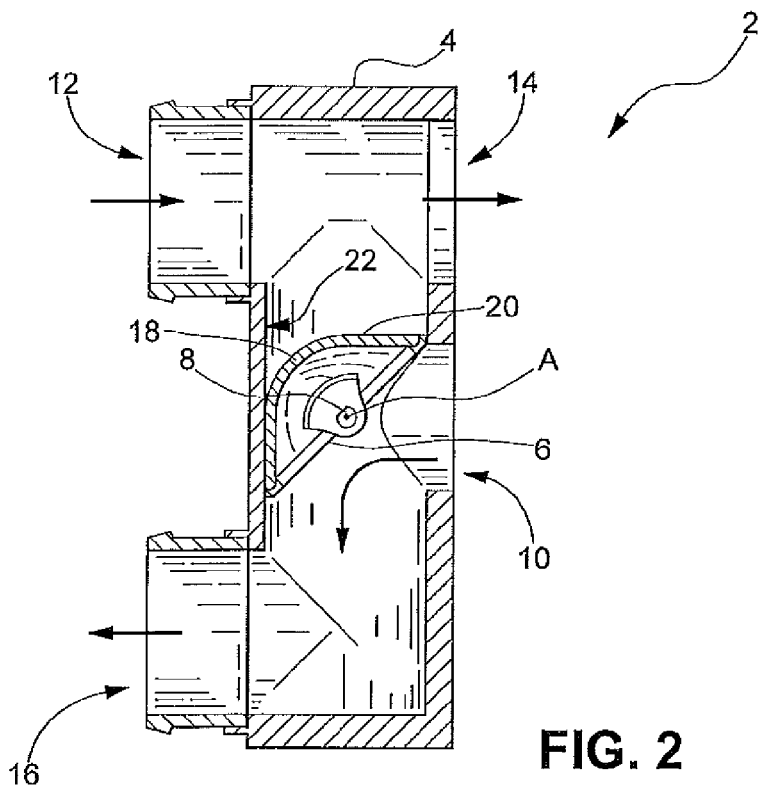
FIG. 2 shows a side cross-sectional view of the three-way diverter assembly illustrated in FIG. 1, the three-way diverter assembly shown in a second mode of operation.
Figure 3:
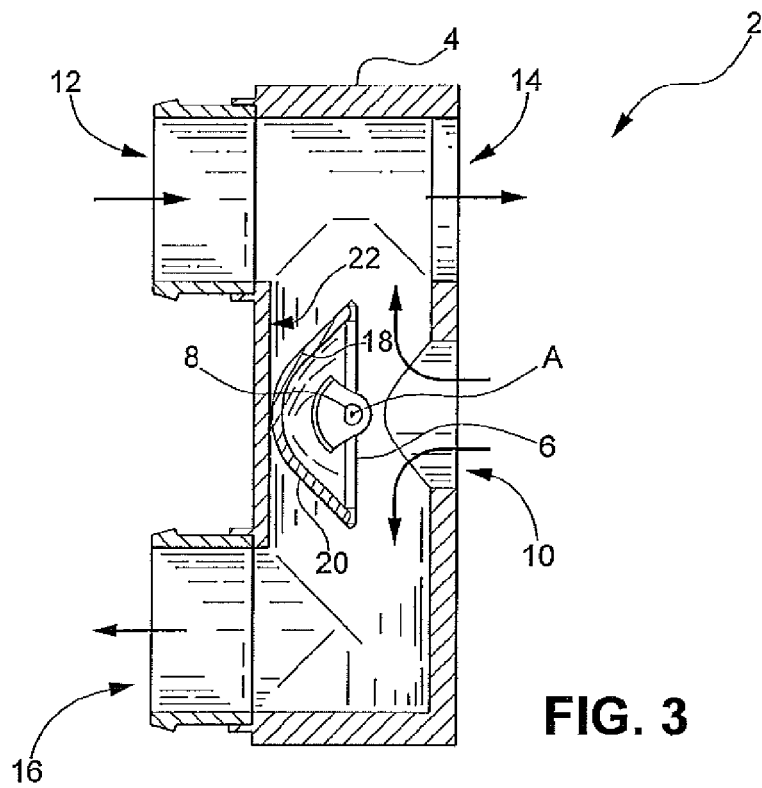
FIG. 3 shows a side cross-sectional view of the three-way diverter assembly illustrated in FIG. 1, the three-way diverter assembly in a third mode of operation.
Figure 6:
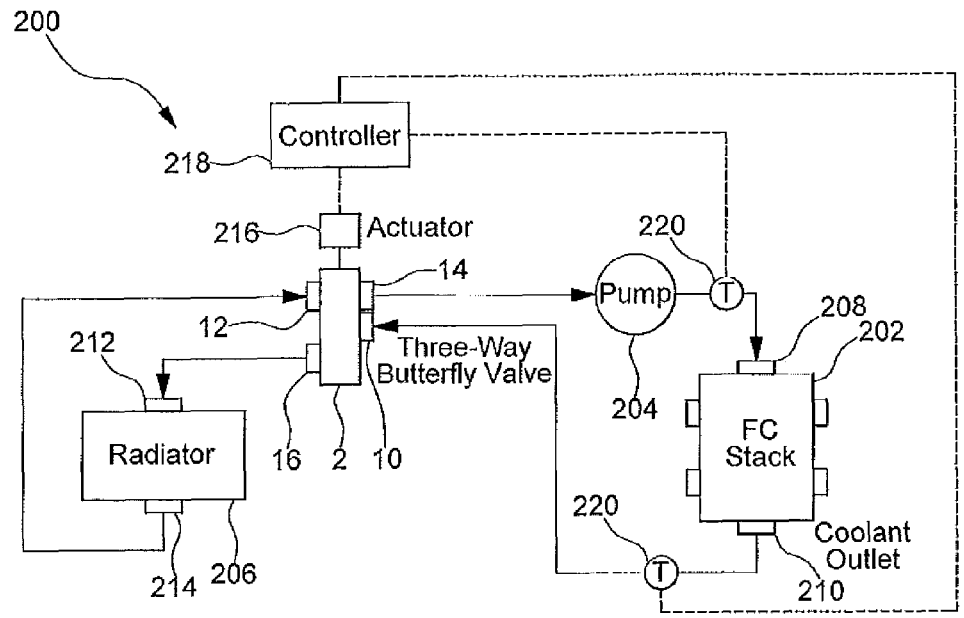
Figure 7:
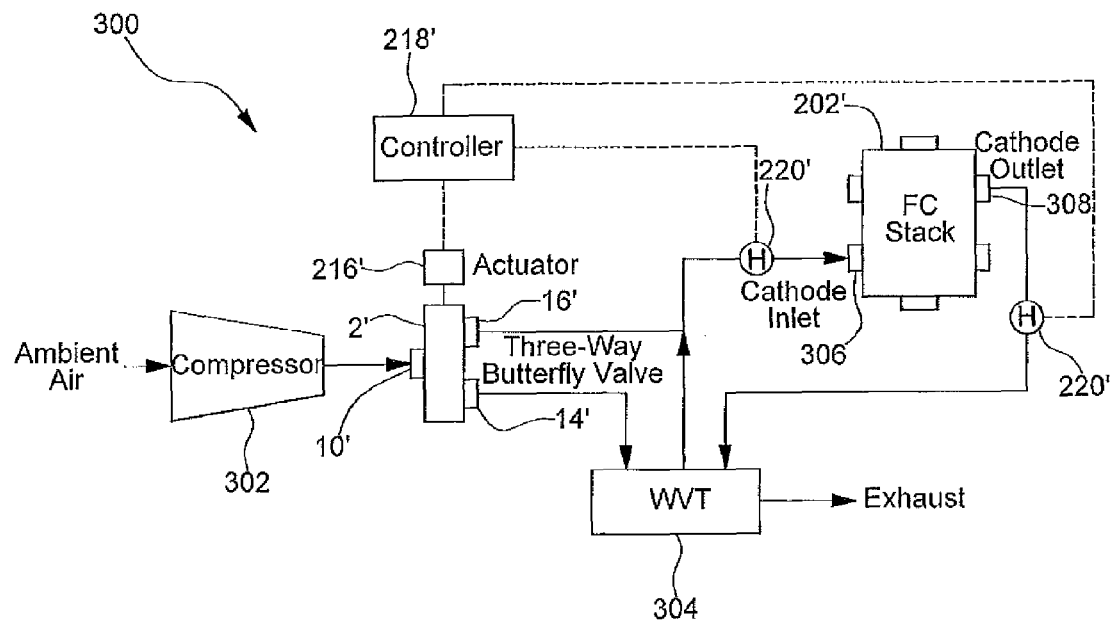

FIG. 6 is a schematic diagram of a fuel cell system having the three-way diverter assembly illustrated in FIGS. 1 to 3, the three-way diverter assembly adapted to regulate a temperature of a fuel cell stack; and FIG. 7 is a schematic diagram of a fuel cell system having the three-way diverter assembly illustrated in FIGS. 1 to 3, the three-way diverter assembly adapted to regulate a humidity of a fuel cell stack.

DETAILED DESCRIPTION OF THE INVENTION

The following description is merely exemplary in nature and is not intended to limit the present disclosure, application, or uses. It should also be understood that throughout the drawings, corresponding reference numerals indicate like or corresponding parts and features.

FIGS. 1 to 3 depict a three-way diverter assembly 2 according to one embodiment of the present disclosure. In the embodiment shown, the three-way diverter assembly 2 has a housing 4 with a contoured valve 6 disposed therein. The contoured valve 6 is selectively rotatable about an axis A from a first positional limit shown in FIG. 1 to a second positional limit shown in FIG. 2. The contoured valve 6 is also rotatable to a plurality of positions between the first positional limit and the second positional limit, such as the position of the contoured valve 6 shown in FIG. 3, for example.

The housing 4 may be a discrete component having the contoured valve 6. In other embodiments, the housing 4 is integrally formed as part of another component of a fuel cell system, for example, as part of an end unit of a fuel cell stack. At least one of the housing 4 and the contoured valve 6 can be formed from one of a polymer, a metal, and a composite material, for example. Other suitable materials may also be employed. In one embodiment, the first positional limit of the contoured valve 6 is from about a forty-five degree (45°) rotation to about a one hundred degree (100°) rotation about the axis A from the second positional limit. In a particularly illustrative embodiment, the first positional limit of the contoured valve 6 is about a ninety degree (90°) rotation about the axis A from the second positional limit. It should be appreciated that a location of the first and second position limits may be selected as desired.

The three-way diverter assembly 2 includes a pivot shaft 8. The pivot shaft 8 is disposed substantially on the axis A about which the contoured valve 6 is adapted to rotate. The pivot shaft 8 is disposed through the housing 4 and coupled to the contoured valve 6. In another embodiment, the pivot shaft 8 is integrally formed with the contoured valve 6. The pivot shaft 8 rotates the contoured valve 6 about the axis A when a torque is applied thereto. An interior of the housing 4 within which the contoured valve 6 rotates may be a substantially cylindrical bore, for example. Other suitable interior dimensions and shapes for the housing 4 may also be employed.

The housing 4 has a first inlet 10, a first outlet 14, and a second outlet 16. In certain embodiments, the housing 4 also includes a second inlet 12. The first inlet 10 and the second inlet 12 are adapted to receive a fluid from at least one fluid source. The contoured valve 6 selectively causes the fluid to flow to at least one of the first outlet 14 and the second outlet 16 as desired. As a nonlimiting example, the first inlet 10 and the first outlet 14 may be disposed on a first side of the housing 4, and the second inlet 12 and the second outlet 16 may be dispose on a second side of the housing opposite the first side. It should be understood that other desirable configurations and locations of the first inlet, 10, the first outlet 14, the second outlet 16, and optionally, the second inlet 12 may be selected.

The contoured valve 6 has a first surface 18 and a second surface 20. The first surface 18 is adjacent the first inlet 10. The second surface 20 of the three-way diverter assembly 2 is disposed opposite the first surface 18 and the first inlet 10. At least one of the first surface 18 and the second surface 20 of the contoured valve 6 may be at least one of curvilinear and rectilinear. As a nonlimiting example, the first surface 18 of the contoured valve 6 is concave. As a further nonlimiting example, the second surface 20 of the contoured valve 6 is convex. In one embodiment, the contoured valve 6 is substantially cup-shaped. In another embodiment, the contoured valve 6 is substantially delta-shaped.

Figure 4:
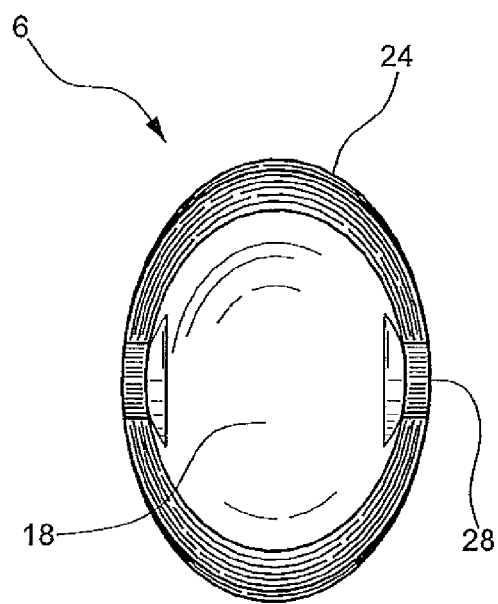
FIG. 4 shows a front elevational view of the contoured valve in the three-way diverter assembly according to an embodiment of the present disclosure.
Figure 5:
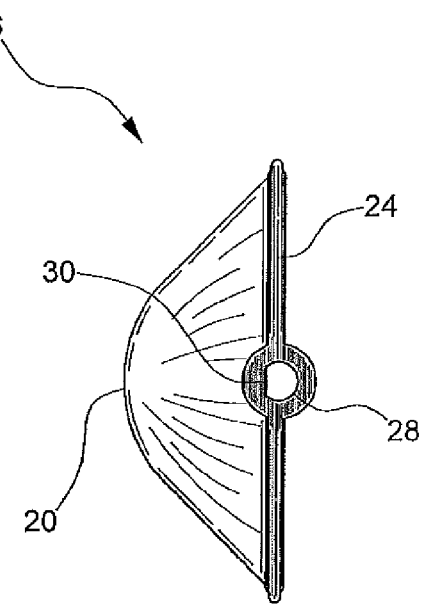
FIG. 5 shows a side elevational view of the contoured valve illustrated in FIG. 4.

As further shown in FIGS. 4 and 5, the contoured valve 6 has a concave contour that minimizes a pressure drop across the three-way diverter assembly 2 when the contoured valve 6 is seated at each of the first positional limit and the second positional limit. It should be appreciated that, because the first surface 18 of the contoured valve 6 is not substantially flat or planar, the pressure drop across the three-way diverter assembly at the first and second positional limits may be optimized. A suitable concave shape for the first surface 18 may be selected as desired.

The convex contour of the second surface 20 of the contoured valve 6 substantially restricts a flow of the fluid between an inner surface 22 of the housing 4 and the second surface 20 at the first and second positional limits and the plurality of positions therebetween. The second surface 20 of the contoured valve 6 may also militate against nonlinearity in flow control, for example, by minimizing backflow across the surface 20 as the contoured valve 6 is rotated between the first positional limit and the second positional limit. In particular, a clearance between the inner surface 22 and the second surface 20 may militate against the fluid flowing therebetween and enable a substantially linear control of the fluid flow through the three-way diverter assembly with the contoured valve 6 position. As nonlimiting examples, the clearance between the inner surface 22 and the second surface 20 is from about 0.01 mm to about 0.5 mm, particularly from about 0.05 mm to about 0.4 mm, and more particularly from about 0.1 mm to about 0.3 mm. Other suitable clearances may also be employed. A suitable convex shape for the second surface 20 may also be selected as desired.

The contoured valve 6 may include an elastomeric seal 24. The elastomeric seal 24 may facilitate a substantially fluid tight seal between the contoured valve 6 and the inner surface 22 of the housing 4. The elastomeric seal 24 may also facilitate a substantially fluid tight seal between the contoured valve 6 and the pivot shaft 8. The substantially fluid tight seals facilitated by the elastomeric seal militate against a leakage of the fluid between at least one of the contoured valve 6 and the inner surface 22, and the contoured valve 6 and the pivot shaft 8. For example, the elastomeric seal 24 is a rubber overmolding formed on a peripheral edge of the contoured valve 6. A skilled artisan should appreciate that other suitable elastomeric seals 24 may also be employed.

It should be appreciated that, under conventional flow rates of a coolant fluid, for example, in a fuel cell system, the contoured valve 6 at each of the first positional limit the second positional limit provides less than about 200 cc/minute in fluid leakage, particularly less than about 100 cc/minute, and most particularly less than about 50 cc/minute of fluid leakage during operation of the three-way diverter assembly 2. Other suitable leakage tolerances may be selected as desired, for example, based on desired parameters of the fuel cell system 200.

In a particular embodiment shown in FIGS. 4 and 5, contoured valve 6 has at least one aperture 28 formed therein for receiving the pivot shaft 8. The at least one aperture 28 may have at least one substantially flat portion 30 configured to cooperate with a substantially flat surface (not shown) of the pivot shaft 8 and militate against a free rotation of the contoured valve 6 about the pivot shaft 8. In other embodiments, the pivot shaft 8 may be bonded to the contoured valve 6, such as by an adhesive. Other suitable means for militating against a free rotation of the contoured valve about the pivot shaft 8, such as a cooperation of a polygonal pivot shaft 8 with a matching polygonal aperture 28, may be employed.

As shown in FIG. 6, the present disclosure further includes a first fuel cell system 200 having the three-way diverter assembly 2. The first fuel cell system 200 includes a fuel cell stack 202, a fluid pump 204, and a radiator 206. The fuel cell stack 202 includes a plurality of fuel cells and has a coolant inlet 208 and a coolant outlet 210 for circulating a coolant fluid, such as water, therethrough for purpose of regulating a temperature of the fuel cell stack 202. An exemplary fuel cell stack 200 is described in applicant's copending U.S. application Ser. No. 11/874,317, incorporated herein by reference in its entirety.

The fluid pump 204 is in fluid communication with the fuel cell stack 202 and adapted to provide a flow of the coolant fluid thereto. For example, the fluid pump 204 may be part of a coolant system having, for example, a coolant tank (not shown) for containing the coolant fluid circulating through the coolant system to and from the fuel cell stack 202. The pump 204 is in fluid communication with the radiator 206. The radiator 206 has a radiator inlet 212 and a radiator outlet 214. The radiator 206 is also in fluid communication with the fuel cell stack 202 and is adapted to exhaust excess heat from the coolant fluid flowing through the fuel cell stack 202 to the ambient atmosphere.

In a particularly illustrative embodiment, the three-way diverter assembly 2 is disposed between the fuel cell stack 202 and the radiator 206 and is adapted to thermostatically regulate the fuel cell stack 202. The first inlet 10 of the three-way diverter assembly 2 is in fluid communication with the coolant outlet 210 of the fuel cell stack 202. The second inlet 12 of the three-way diverter assembly 2 is in fluid communication with the radiator outlet 214. The first outlet 14 of the three-way diverter assembly is in fluid communication with the coolant inlet 208 of the fuel cell stack 202. The second outlet of the three-way diverter assembly is in fluid communication with the radiator inlet 212.

The first fuel cell system 200 may further include an actuator 216. The actuator 216 is coupled to the contoured valve 6 of the three-way diverter assembly 2. The actuator 216 is adapted to rotate the contoured valve 6 about the axis A as desired. The actuator 216 may include an electric step-motor, for example, configured to selectively and precisely rotate the contoured valve 6 to any desired position from the first positional limit to the second positional limit. In another embodiment, the actuator 216 is formed as part of the three-way diverter assembly 2. Other suitable actuators 216 may also be employed.

The first fuel cell system 200 may also include a controller 218. The controller 218 is in electrical communication with the three-way diverter assembly 2. The controller 218 selectively commands the position of the contoured valve 6 within the three-way diverter assembly 2 to thermostatically regulate the fuel cell stack 202. In a particular embodiment, the controller 218 is in electrical communication with the actuator 216 and selectively controls the actuator 216 to rotate the contoured valve 6 to the desired position.

It should be understood that the fuel cell system may include at least one sensor 220 in electrical communication with the controller 218. The sensor 220 provides feedback on a condition of the fuel cell stack 202 that the controller 218 receives and processes for purpose of controlling the three-way diverter assembly 2. The feedback on the condition of the fuel cell stack 202 may be continuously monitored to command the three-way diverter assembly 2 in response to the "real time" condition. As a nonlimiting example, the sensor 220 may be a temperature sensor. The temperature sensor may monitor the temperature of the coolant fluid at at least one of prior to the coolant fluid entering the fuel cell stack 202, at the fuel cell stack 202, and after the coolant fluid exits the fuel cell stack 202, for example. Other suitable locations within the first fuel cell system 200 for monitoring the temperature with the sensor 220 may also be used.

The at least one sensor 220 may also provide feedback relevant to transient conditions of an electric vehicle (not shown) having the first fuel cell system 200. As a nonlimiting example, the at least one sensor 220 may respond to an "open throttle" condition of the electric vehicle. The at least one sensor 220 may provide the feedback of the vehicle condition to the controller 218. The controller 218 may anticipate a change in temperature of the fuel cell stack 202 in relation to the vehicle condition, for example, by employing a suitable algorithm or mathematical relationship. The controller 218 controls the three-way diverter assembly 2 to thermostatically regulate the fuel cell stack 202 and maintain the temperature of the fuel cell stack 202 within the desired range in advance of the anticipated change in temperature.

In operation, the three-way diverter assembly 2 selectively causes a) the coolant fluid to bypass the radiator 206, b) the coolant fluid to flow to the radiator 206, and c) a combination of a) and b) to thermostatically regulate the fuel cell stack 202. For example, during a start-up operation of the fuel cell stack 202, the three-way diverter assembly 2 may cause the coolant fluid to heat the fuel cell stack 202 by militating against an exhausting of heat from the coolant fluid via the radiator 206 and recirculating the coolant fluid to the fuel cell stack 202. The coolant fluid may be caused to bypass the radiator by rotating the contoured valve 6 to the first position limit shown in FIG. 1. The contoured valve 6 rotated to the first positional limit may form a substantially fluid tight seal with the housing 4 that causes the coolant fluid to flow out of the first outlet 14, bypass the radiator 206, and flow to the fuel cell stack 202. The three-way diverter assembly 2 operated in this manner is in a "bypass radiator mode". As the electrochemical reaction within the fuel cell stack 202 is exothermic, the coolant fluid progressively increases in temperature as the coolant fluid circulates through the fuel cell stack 202. The coolant fluid is recirculated through the fuel cell stack 202 until the temperature of the fuel cell stack 202 is within a desired temperature range.

During a further operation of the three-way diverter assembly 2, the three-way diverter assembly 2 militates against an overheating of the fuel cell stack 202. The three-way diverter assembly 2 may cause the coolant fluid to flow to the radiator 206 where any excess heat is exhausted from the first fuel cell system 200. For example, the contoured valve 6 may be rotated to the second positional limit shown in FIG. 2. The contoured valve 6 rotated to the second positional limit may form a substantially fluid tight seal with the housing 4 that causes the coolant fluid to flow out of the second outlet 16 to the radiator 206. The three-way diverter assembly 2 operated in this manner is in a "radiator mode".

Upon an attainment of a desirable temperature of the fuel cell stack 202, a first portion of the coolant fluid may be caused to flow to the radiator 206. A second portion of the coolant fluid may simultaneously be caused to bypass the radiator 206 and flow to the fuel cell stack 202. The first and second portions of the coolant fluid having different temperatures are combined and circulated to the fuel cell stack 202 to maintain the temperature thereof within a desired range.

A second fuel cell system 300 according to the present disclosure is shown in FIG. 7. Like or related structure from FIGS. 1 to 6 and shown in FIG. 7 have the same reference numeral with a prime (') symbol for purpose of clarity.

The second fuel cell system 300 employs the three-way diverter assembly 2' to regulate a relative humidity of the fuel cell stack 202'. The second fuel cell system 300 includes the three-way diverter assembly 2' having the first inlet 10', the first outlet 14', and the second outlet 16'. The second fuel cell system 300 further includes the fuel cell stack 202', an air compressor 302, and a humidifier or water vapor transfer (WVT) device 304 as are known in the art. The fuel cell stack 202' has a plurality of fuel cells, a cathode inlet 306, and a cathode outlet 308. The air compressor 302 is in fluid communication with the fuel cell stack 202' and adapted to provide a flow of charged air thereto. The WVT device 304 is in fluid communication with the air compressor 302 and the fuel cell stack 202'. The WVT device 304 is adapted to selectively humidify the charged air provided to the fuel cell stack 202'. The WVT device 304 may transfer moisture to the charged air from a cathode exhaust stream exiting the cathode outlet 308, for example. Other suitable means for humidifying the charged air may also be employed.

The three-way diverter assembly 2' is disposed in communication with the air compressor 302 and each of the fuel cell stack 202' and the WVT device 304. The first inlet 10' is in fluid communication with the air compressor 302. The first outlet 14' is in fluid communication with the WVT device 304. The three-way diverter assembly 2' is adapted to selectively cause a) the charged air to bypass the WVT device 304 and flow to the fuel cell stack 202', b) the charged air to flow to the WVT device 304, and c) a combination of a) and b) to regulate the humidity of the fuel cell stack 202'.

In a further embodiment, the second fuel cell system 300 includes the actuator 216', the controller 218', and at least one humidity sensor 220'. The actuator 216' is coupled to the contoured valve 6' of the three-way diverter assembly 2'. The actuator 216' selectively rotates the contoured valve 6' about the axis A' from the first positional limit to the second positional limit, and to desired positions therebetween. The controller 218' is in electrical communication with the actuator 216'. The controller 218' selectively controls the position of the contoured valve 6' to regulate the humidity of the fuel cell stack 202'. The at least one humidity sensor 220 is in electrical communication with the controller and provides a feedback of the charged air relative humidity to the controller 218' for purpose of controlling the three-way diverter assembly 2'.

In operation, the three-way diverter assembly 2' may deliver the charged air from the air compressor 302 to the WVT device 304 when the contoured valve 6' is seated at the first positional limit. The three-way diverter assembly 2' may also bypass the WVT device 304 and deliver the charged air from the air compressor 302 to the fuel cell stack 202' when the contoured valve 6' is seated at the second positional limit. When the contoured valve 6' is at a position between the first and second positional limits, the charged air may be humidified to a desirable level and delivered to the fuel cell stack 202'. The relative humidity of the fuel cell stack 202' is thereby regulated.

One of ordinary skill in the art should likewise understand that the three-way diverter assembly 2, 2' described herein may be used in a fuel cell system in place of any three-way valve presently employed and known in the art.

It is surprisingly found that the three-way diverter assembly 2, 2' having the contoured valve 6, 6' does not have the control issues associated with known three-way butterfly valves. In particular, contoured valve 6, 6' produces a more linear relationship between flow of fluid and position of the contoured valve 6, 6' than with known three-way butterfly valves 2, 2' having substantially flat plates. The more linear relationship between fluid flow and position of the contoured valve 6, 6' may result in part from the convex contour on the second surface 20 of the contoured valve 6, 6'.

The substantially fluid tight seal at each of the first and second positional limits is particularly advantageous over known valves under low ambient temperatures when a coolant fluid leakage, for example, may result in an inefficient buildup in temperature of the fuel cell stack 202. The substantially fluid tight seal at each of the first and second positional limits is also advantageous over known valves under high ambient temperatures when the coolant fluid leakage may result in an undesirable overheating of the fuel cell stack 202.

The pressure drop across the three-way diverter assembly 2, 2' at the first and second positional limits is also substantially reduced in comparison to known three-way butterfly valves with substantially flat plates. Moreover, an amount of torque required to actuate the three-way diverter assembly 2, 2' is substantially the same as with three-way butterfly valves known in the art. When coupled to an actuator 216, 216' as described hereinabove, the three-way diverter assembly 2, 2' can perform as at least one of an electric thermostat for the fuel cell stack 202 and as relative humidity regulator for the fuel cell stack 202'.

The employment of the three-way diverter assembly 2, 2' described herein allows for a replacement of both a conventional diverter assembly and a conventional electronic thermostat for controlling a temperature of the fuel cell stack 202, 202'. Accordingly, the three-way diverter assembly 2, 2' enables a simplification of the fuel cell system 200, 200' and reduces a manufacturing cost thereof.

While certain representative embodiments and details have been shown for purposes of illustrating the invention, it will be apparent to those skilled in the art that various changes may be made without departing from the scope of the disclosure, which is further described in the following appended claims.

What is claimed is:

1. A three-way diverter assembly, comprising:
    a housing having a first inlet, a first outlet, and a second outlet, the first inlet adapted to receive a fluid; and
    a contoured valve disposed in the housing adjacent the first inlet, the contoured valve selectively rotatable about an axis from a first positional limit to a second positional limit,
    wherein the contoured valve is substantially cup-shaped and has an exposed concave first surface and a convex second surface, the first surface disposed adjacent the first inlet, the second surface disposed adjacent an inner surface of the housing opposite the first inlet, the first surface disposed between the second surface and the first inlet.

2. The three-way diverter assembly of claim 1, wherein the contoured valve selectively causes the fluid to flow to at least one of the first outlet and the second outlet.

3. The three-way diverter assembly of claim 1, wherein the contoured valve includes an elastomeric seal.

4. The three-way diverter assembly of claim 1, wherein the housing includes a second inlet adapted to receive a fluid.

5. The three-way diverter assembly of claim 1, wherein a clearance between the second surface of the contoured valve and the inner surface of the housing militates against a flowing of the fluid therebetween.

6. The three-way diverter assembly of claim 1, further including a pivot shaft disposed through the housing and coupled to the contoured valve, wherein the pivot shaft rotates the contoured valve about the axis when a torque is applied thereto.

7. The three-way diverter assembly of claim 6, wherein the contoured valve includes at least one aperture for receiving the pivot shaft, the at least one aperture having a substantially flat portion configured to receive a substantially flat surface of the pivot shaft and militate against a free rotation of the contoured valve about the pivot shaft.

8. The three-way diverter assembly of claim 1, the housing having a first side and a second side, wherein the first inlet and the first outlet are disposed on the first side and the second inlet and the second outlet are disposed on the second side.

9. The three-way diverter assembly of claim 1, wherein one of the housing and the contoured valve is formed from one of a polymer, a metal, and a composite material.

10. The three-way diverter assembly of claim 1, wherein the first positional limit of the contoured valve is a ninety degree (90°) rotation about the axis from the second positional limit.

11. A fuel cell system, comprising:
    a fuel cell stack including a plurality of fuel cells and having a coolant fluid inlet and a coolant fluid outlet;
    a pump in fluid communication with the fuel cell stack and adapted to provide a coolant fluid thereto;
    a radiator having a radiator inlet and a radiator outlet, the radiator in fluid communication with the fuel cell stack and the fluid pump; and
    a three-way diverter assembly disposed between the radiator and the fuel cell stack and adapted to regulate the temperature of the fuel cell stack, the three-way diverter assembly further comprising:
        a housing having a first inlet in fluid communication with the coolant fluid outlet of the fuel cell stack, a second inlet in fluid communication with the radiator outlet, a first outlet in fluid communication with the coolant fluid inlet of the fuel cell stack, and a second outlet in fluid communication with radiator inlet, and
        a contoured valve disposed in the housing adjacent the first inlet, the contoured valve selectively rotatable about an axis from a first positional limit to a second positional limit, wherein the contoured valve is substantially cup-shaped and has an exposed concave first surface and a convex second surface, the first surface disposed adjacent the first inlet, the second surface disposed adjacent an inner surface of the housing opposite the first inlet, the first surface disposed between the second surface and the first inlet;
        wherein the three-way diverter assembly selectively causes one of a) the coolant fluid to bypass the radiator and flow to the fuel cell stack, b) the coolant fluid to flow to the radiator, and c) a combination of a) and b), to thermostatically regulate the fuel cell stack.

12. The fuel cell system of claim 11, further comprising: an actuator coupled to the contoured valve of the three-way diverter assembly, the actuator selectively rotating the contoured valve about the axis from the first positional limit to the second positional limit.

13. The fuel cell system of claim 12, wherein the actuator is an electric stepper motor providing a precise control of the contoured valve position.

14. The fuel cell system of claim 13, further comprising: a controller in electrical communication with the actuator, the controller selectively controlling the position of the contoured valve to thermostatically regulate the fuel cell stack.

15. The fuel cell system of claim 14, further comprising at least one sensor in electrical communication with the controller and providing a feedback of one of the coolant fluid temperature and fuel cell stack conditions thereto.

16. The fuel cell system of claim 11, wherein i) the contoured valve at the first positional limit forms a substantially fluid tight seal with the housing that causes the coolant fluid to bypass the radiator and flow to the fuel cell stack; ii) the contoured valve at the second positional limit forms a substantially fluid tight seal with the housing that causes the coolant fluid to flow to the radiator prior to flowing to the fuel cell stack; and iii) the contoured valve at the positions between the first positional limit and the second positional limit causes a first portion of the coolant fluid to bypass the radiator and flow to the fuel cell stack and a second portion of the coolant fluid to flow to the fuel cell stack.

17. A fuel cell system, comprising:
    a fuel cell stack including a plurality of fuel cells and having a cathode inlet and a cathode outlet;
    an air compressor in fluid communication with the fuel cell stack and adapted to provide a flow of charged air thereto;
    a water vapor transfer device in fluid communication with the air compressor and the fuel cell stack and adapted to selectively humidify the charged air; and a three-way diverter assembly in fluid communication with the air compressor and each of the fuel cell stack and the water vapor transfer device, the three-way diverter assembly adapted to regulate a relative humidity of the fuel cell stack, the three-way diverter assembly further comprising:
- a housing having a first inlet in fluid communication with the air compressor, a first outlet in fluid communication with the water vapor transfer device, and a second outlet in fluid communication with the cathode inlet of the fuel cell stack, and
- a contoured valve disposed in the housing adjacent the first inlet, the contoured valve selectively rotatable about an axis from a first positional limit to a second positional limit, wherein the contoured valve is substantially cup-shaped and has an exposed concave first surface and a convex second surface, the first surface disposed adjacent the first inlet, the second surface disposed adjacent an inner surface of the housing opposite the first inlet, the first surface disposed between the second surface and the first inlet;

wherein the three-way diverter assembly selectively causes one of a) the charged air to bypass the water vapor transfer device and flow to the fuel cell stack, b) the charged air to flow to the water vapor transfer device, and c) a combination of a) and b), to regulate a humidity of the fuel cell stack.

18. The fuel cell system of claim 17, further comprising:

an actuator coupled to the contoured valve of the three-way diverter assembly, the actuator selectively rotating the contoured valve about the axis from the first positional limit to the second positional limit;

a controller in electrical communication with the actuator, the controller selectively controlling the position of the contoured valve to regulate the humidity of the fuel cell stack; and at least one humidity sensor in electrical communication with the controller and providing a feedback of the charged air humidity thereto.

* * * * *